United States Patent
Cristobal et al.

(10) Patent No.: US 11,410,322 B2
(45) Date of Patent: Aug. 9, 2022

(54) DEVICE AND METHOD FOR PERFORMING SIMULTANEOUS LOCALIZATION AND MAPPING

(71) Applicant: HUAWEI TECHNOLOGIES CO., LTD., Shenzhen (CN)

(72) Inventors: Miguel Cristobal, Munich (DE); Panji Setiawan, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/920,058

(22) Filed: Jul. 2, 2020

(65) Prior Publication Data

US 2020/0334841 A1 Oct. 22, 2020

Related U.S. Application Data

(63) Continuation of application No. PCT/EP2018/074205, filed on Sep. 7, 2018.

(51) Int. Cl.
*G06T 7/579* (2017.01)
*G06T 7/73* (2017.01)

(52) U.S. Cl.
CPC ............ *G06T 7/579* (2017.01); *G06T 7/74* (2017.01); *G06T 2207/10028* (2013.01); *G06T 2207/30244* (2013.01); *G06T 2207/30252* (2013.01)

(58) Field of Classification Search
None
See application file for complete search history.

(56) References Cited

U.S. PATENT DOCUMENTS

2016/0247290 A1* 8/2016 Liu ................ G06K 9/00791
2019/0387209 A1* 12/2019 Yang ................ H04N 13/128

FOREIGN PATENT DOCUMENTS

JP 2017208038 A 11/2017

OTHER PUBLICATIONS

ORB-SLAM2: an Open-Source SLAM System for Monocular, Stereo and RGB-D Cameras. Mur-Artal et al. (Year: 2017).*
ORB-SLAM: a Versatile and Accurate Monocular SLAM System. Mur-Artal et al. (Year: 2015).*
(Continued)

*Primary Examiner* — Delomia L Gilliard
(74) *Attorney, Agent, or Firm* — Leydig, Voit & Mayer, Ltd.

(57) ABSTRACT

A device and method perform Simultaneous Localization and Mapping (SLAM). The device includes at least one processor configured to perform the SLAM method, which includes the following operations. Preprocess, in a first processing stage, a received data sequence including multiple images recorded by a camera and sensor readings from multiple sensors in order to obtain a frame sequence. Each frame of the frame sequence includes a visual feature set related to one of the images at a determined time instance and sensor readings from that time instance. Sequentially process, in a second processing stage, each frame of the frame sequence based on the visual feature set and the sensor readings included in that frame in order to generate a sequence mapping graph. Merge, in a third processing stage, the sequence mapping graph with at least one other graph, in order to generate or update a full graph.

16 Claims, 7 Drawing Sheets

(56) References Cited

OTHER PUBLICATIONS

Improving stereo vision based SLAM by integrating inertial measurements for person indoor navigation. Albrecht et al. (Year: 2018).*
SLAM-based Cooperative Calibration for Optical Sensors Array with GPS/IMU Aided. Wang et al. (Year: 2016).*
Rublee et al., "ORB: an efficient alternative to SIFT or SURF," 2011 IEEE International Conference on Computer Vision, Barcelona, Spain, pp. 2564-2571, Institute of Electrical and Electronics Engineers, New York, New York (Nov. 2011). (Year: 2011).*
Mur-Artal et al., "ORB-SLAM2: An Open-Source SLAM System for Monocular, Stereo, and RGB-D Cameras," IEEE Transactions on Robotics, vol. 33, No. 5, XP055589457, pp. 1255-1262, Institute of Electrical and Electronics Engineers, New York, New York (Oct. 2017).
Mur-Artal et al., "ORB-SLAM: A Versatile and Accurate Monocular SLAM System," IEEE Transactions on Robotics, vol. 31, No. 5, XP011670910, pp. 1147-1163, Institute of Electrical and Electronics Engineers, New York, New York (Oct. 2015).
Albrecht et al., "Improving Stereo Vision based SLAM by Integrating Inertial Measurements for Person Indoor Navigation," 2018 4th International Conference on Control, Automation and Robotics, XP033358887, pp. 327-331, Institute of Electrical and Electronics Engineers, New York, New York (Apr. 2018).
Mur-Artal et al., "Visual-Inertial Monocular SLAM with Map Reuse," XP080816053, Total 8 pages, Institute of Electrical and Electronics Engineers, New York, New York (Oct. 2016).
Cadena et al., "Past, Present, and Future of Simultaneous Localization And Mapping: Towards the Robust-Perception Age," XP055448575, pp. 1-27, Institute of Elecliical and Electronics Engineers, New York, New York (Jul. 2016).
Zijlmans"LSD-slam and ORB-slam2, a literature based explanation," pp. 1-20 (Aug. 23, 2017).
Mur-Artal et al., "Visual-Inertial Monocular SLAM with Map Reuse," IEEE Robotics and Automation Letters, vol. 2, No. 2, pp. 796-803, Institute of Electrical and Electronics Engineers, New York, New York (Apr. 2017).
Lhuillier "Incremental Fusion of Structure-from-Motion and GPS Using Constrained Bundle Adjustments," IEEE Transactions on Pattern Analysis and Machine Intelligence, vol. 34, No. 12, pp. 2489-2495, Institute of Electrical and Electronics Engineers, New York, New York (Dec. 2012).
Triggs et al., "Bundle Adjustment—A Modern Synthesis," ICCV'99 Proceedings of the International Workshop on Vision Algorithms: Theory and Practice, Total 72 pages, Springer-Verlag, London, UK (Dec. 2010).
Mur-Artal et al., "ORB-SLAM2: an Open-Source SLAM System for Monocular, Stereo and RGB-D Cameras," IEEE Transactions on Robotics, vol. 33, No. 5, Total 7 pages, Institute of Elecliical and Electronics Engineers, New York, New York (Oct. 2016).
Engel et al., "Large-Scale Direct SLAM with Stereo Cameras," 2015 IEEE/RSJ International Conference on Intelligent Robots and Systems (IROS), Hamburg, Germany, Total 8 pages, Institute of Electrical and Electronics Engineers, New York, New York (Sep.-Oct. 2015).
Mur-Artal et al., "Visual-Inertial Monocular SLAM with Map Reuse," IEEE Robotics and Automation Letters, vol. 2, No. 2, Total 9 pages, Institute of Electrical and Electronics Engineers, New York, New York (Jan. 2017).
Kümmerle et al., "g²o: A General Framework for Graph Optimization," 2011 IEEE International Conference on Robotics and Automation, Shanghai, China, pp. 3607-3613, Institute of Electrical and Electronics Engineers, New York, New York (May 2011).
Rublee et al., "ORB: an efficient alternative to SIFT or SURF," 2011 IEEE International Conference on Computer Vision, Barcelona, Spain, pp. 264-2571, Institute of Electrical and Electronics Engineers, New York, New York (Nov. 2011).
Kitt et al., "Moving on to Dynamic Environments: Visual Odometry using Feature Classification," The 2010 IEEE/RSJ International Conference on Intelligent Robots and Systems, Taipei, Taiwan, pp. 5551-5556, Institute of Electrical and Electronics Engineers, New York, New York (Oct. 2010).
JP/2020-534243, Notice of Reasons for Rejection, dated Aug. 23, 2021.
Wang et al., "SLAM-based Cooperative Calibration for Optical Sensors Array with GPS/IMU Aided," 2016 International Conference on Unmanned Aircraft Systems (ICUAS), IEEE, 2016, https://ieeexplore.ieee.org/document/7502643, Arlington, VA, USA, total 9 pages (Jun. 7-10, 2016).

* cited by examiner

701 — Preprocess, in a first processing stage, a received data sequence including multiple images recorded by a camera and sensor readings from multiple sensors, in order to obtain a frame sequence, wherein each frame includes a visual feature set related to one of the images at a determined time instance and sensor readings from that time instance.

702 — Sequentially process, in a second processing stage, each frame of the frame sequence based on the visual feature set and the sensor readings included in that frame, in order to generate a sequence mapping graph.

703 — Merge, in a third processing stage, the sequence mapping graph with at least one other graph, in order to generate or update a full graph.

FIG. 7

DEVICE AND METHOD FOR PERFORMING SIMULTANEOUS LOCALIZATION AND MAPPING

CROSS REFERENCE TO RELATED APPLICATIONS

This application is a continuation of International Application No. PCT/EP2018/074205, filed on Sep. 7, 2018, the disclosure of which is hereby incorporated by reference in its entirety.

FIELD

The present disclosure relates to Simultaneous Localization and Mapping (SLAM).

BACKGROUND

The next generation of safety and vehicle automation will rely on precise positioning or localization, yet Global Positioning System (GPS)-based positioning is hampered by frequent blockages of the GPS signal, even in normal driving situations. One of the main technical problems faced by the positioning is the map creation (i.e., mapping). In order to have a successful mapping, a positioning or localization is needed. Therefore, it is mandatory to perform the so-called SLAM.

Conventional SLAM methods with stereo cameras are, for instance, the ORB-SLAM2 and the Stereo LSD-SLAM, which belong to the feature-based and direct methods, respectively (medium.com/@j.zijlmans/lsd-slam-vs-orb-slam2-a-literature-based-comparison-20732df431d).

Extensions of SLAM combining sensors is still an open research topic. For instance, in a first approach (R. Mur-Artal and J. D. Tara's, "*Visual-Inertial Monocular SLAM With Map Reuse*", IEEE Robotics and Automation Letters, vol. 2, no. 2, pp. 796-803, April 2017) a monocular ORB-SLAM was combined with an Inertial Measurement Unit (IMU). In a second approach (M. Lhuillier, "*Incremental Fusion of Structure-from-Motion and GPS Using Constrained Bundle Adjustments*", IEEE Transactions on Pattern Analysis and Machine Intelligence, vol. 34, no. 12, pp. 2489-2495, December 2012), a bundle adjustment (BA) technique—similar to ORB-SLAM—was combined with a GPS.

In the above first approach, the ORB-SLAM architecture is modified to include the IMU reading in the Tracking, Local Bundle Adjustment (LBA) and Full Bundle Adjustment. Results show that the monocular ORB-SLAM with known scale performs better than visual-inertial monocular ORB-SLAM.

In the above second approach, there are two BAs, i.e., the Standard BA and Fusion BA. The Standard BA minimizes the reprojection error of 3D point features, and the results of this BA are used in the Fusion BA, where the GPS is incorporated. The approach includes three proposed methods, each with its own focus. The first method is minimizing both the reprojection and GPS errors as a sum of squared differences, the other two methods are using barrier term optimization for either the reprojection error or the GPS error. The results show that the barrier term optimization works better than the first method.

However, so far the problem of combining multiple sensors (e.g. GPS and IMU) with SLAM has not been solved. Additionally, a distributed processing architecture for SLAM has not yet been exploited. Accordingly, so far no advantage of so-called crowdsourcing algorithms has taken place.

SUMMARY

In view of the above-mentioned problem, embodiments of the disclosure improve the conventional SLAM approaches. Embodiments of the present disclosure improve the feature-based mapping process, e.g., in terms of modularity, and extend it to include multiple sensors, particularly to include both GPS and IMU. Embodiments of the present disclosure further provide real-time distributed operation. In particular, embodiments of the present disclosure can take advantage of a crowdsourcing algorithm, in which for example multiple devices (e.g., vehicles) contribute to the map creation, by uploading respective sensor readings to, e.g., a cloud.

A first aspect of the present disclosure provides a device for performing SLAM. The device comprises at least one processor configured to: preprocess, in a first processing stage, a received data sequence including multiple images recorded by a camera and sensor readings from multiple sensors, in order to obtain a frame sequence. Each frame includes a visual feature set related to one of the images at a determined time instance and sensor readings from that time instance. The at least one processor is further configured to sequentially process, in a second processing stage, each frame of the frame sequence based on the visual feature set and the sensor readings included in that frame, in order to generate a sequence mapping graph, and merge, in a third processing stage, the sequence mapping graph with at least one other graph, in order to generate or update a full graph.

A "time instance" may be a determined point or an interval in time, or may be a point in time or time interval relative to some starting point in time. For example, the "time instance" may be a time interval between consecutive images in the data sequence. That is, a first image in the data sequence may be taken at a first point in time, and a second image in the data sequence may be taken at a second point in time, and a third image at a third point in time. In this case, the "time instance" of the second image may be the time interval between the first point in time and the second point in time. The sensor readings from that "time instance", i.e. from the same "time instance" of the second image, in this case include all sensor readings between the first point in time and the second point in time. Notably, it is possible that there are no sensor readings during a "time instance", e.g. if the sensors work at a slower frequency than a camera taking the images. Further on, the "time instance" of the third image starts at the second point in time.

The modularity of the device, i.e. the separation into the three processing stages, enables implementing real-time and distributed SLAM. The separation of particularly the second and third processing stages allows obtaining information from multiple data sequences. The third processing stage can correct sensor readings, e.g. can correct for GPS bias, given that multiple overlapping data sequences (e.g. from different devices) are available. The sensor readings allow fusing, e.g., GPS and IMU readings with the visual information obtained by one or more cameras. The structure of the frames further result in less data that needs to be passed to the next processing stage (compared to passing the entire image).

In an implementation form of the first aspect, a visual feature set includes an image feature set comprising one or more 2D key points extracted from the related image, descriptors corresponding to the 2D key points, and disparity and/or depth information of the 2D key points.

Thus, the frames include less information than the entire image, but include enough characteristic visual information to allow performing the sequence mapping. The benefit is that the preprocessed frames, which are to be used in the second processing stage, can be stored, which facilitates e.g. debugging processes. Also, less information needs to be transmitted, e.g., in a distributed device from one processor to the other. The disparity and/or depth information enables the calculation of 3D key points based on the respective 2D key points.

In a further implementation form of the first aspect, the at least one processor is configured to, in the first processing stage: extract an image from the data sequence, rectify the image, extract 2D key points from the rectified image, and generate an image feature set based on the extracted 2D key points.

In a further implementation form of the first aspect, the at least one processor is configured to, in the first processing stage: assign one or more semantic labels to the pixels of the rectified image, and filter the image feature set based on the semantic labels to remove 2D key points from the image feature set related to objects labelled as dynamic objects.

This removes unwanted 2D key points and consequently helps to reduce processing load.

In a further implementation form of the first aspect, the at least one processor is further configured to, in the first processing stage: generate a visual feature set by adding a bag-of-words descriptor to the filtered image feature set, and optionally a hash table for searching the 2D key points, and generate a frame by combining the visual feature set with sensor readings from the same time instance of the image.

This adds more information to the visual feature set. The hash table can further increase speed and robustness of the process. Sensor information can furthermore be implemented in this way.

In a further implementation form of the first aspect, the at least one processor is configured to, in the second processing stage: perform camera tracking based on a visual feature set included in a frame by matching 2D key points in the visual feature set to locally stored 3D key points, in order to obtain a camera pose associated with the frame.

In a further implementation form of the first aspect, the at least one processor is configured to: determine whether the frame is a key frame based on a number of matched 2D key points.

In a further implementation form of the first aspect, the at least one processor is further configured to, in the second processing stage, if it determines that the frame is a key frame: perform a first Local Bundle Adjustment, LBA, based on the camera pose, in order to obtain visual odometry information and a LBA graph, calculate a fused camera pose based on the visual odometry information and the sensor readings included in the frame, and perform a second LBA based on the fused camera pose and the LBA graph, in order to obtain the sequence mapping graph.

A feature matching process in the first LBA is accordingly not affected by, e.g., noisy sensor readings, which prevents inlier loss and tracking failures. The second LBA allows fusing, e.g., GPS and/or IMU with visual odometry data.

In a further implementation form of the first aspect, the at least one processor is further configured to, in the third processing stage: detect the presence of one or more loops and/or overlapping areas shared among the sequence mapping graph and the at least one further graph, merge the sequence mapping graph and the at least one further graph, in order to obtain an intermediate graph, and perform a graph optimization on the intermediate graph based on the detected loops and/or overlapping areas, in order to obtain the full graph.

For instance, a GPS bias can be corrected, if loops or overlapping areas are available.

In a further implementation form of the first aspect, the at least two of the three processing stages are performed in different processors.

This enables a distributed processing of the SLAM.

In a further implementation form of the first aspect, the device is a distributed device and includes at least one terminal device and at least one network device, a processor of the terminal device is configured to perform the first processing stage and transmit the obtained frame sequence to the network device, and a processor of the network device is configured to perform the second and third processing stages.

This enables implementing, e.g., a vehicle automation system. The preprocessing can be done in a real-time manner in a vehicle.

In a further implementation form of the first aspect, the processor of the terminal device is further configured to: perform a real-time localization based on the frame sequence obtained in the first processing stage.

Thus, the real-time localization is separated from the graph (map) update. Notably, for the sake of simplicity because usually there is a rigid transformation between a camera pose and a car pose (if the camera is installed on the car), both terms may be used interchangeably because either pose can directly be obtained given the other pose by means of the rigid transformation.

In a further implementation form of the first aspect, the processor of the terminal device is further configured to: perform the real-time localization according to the second processing stage described above, wherein the second LBA is replaced by a fusion tracking procedure based on the fused camera pose, the LBA graph and a current full graph, in order to obtain a current camera pose.

In a further implementation form of the first aspect, the terminal device is located in a vehicle and the vehicle includes the at least one camera and multiple sensors.

A second aspect of the present disclosure provides a method for performing SLAM. The method comprises: preprocessing, in a first processing stage, a received data sequence including multiple images recorded by a camera and sensor readings from multiple sensors, in order to obtain a frame sequence. Each frame includes a visual feature set related to one of the images at a determined time instance and sensor readings from that time instance The method further comprises: sequentially processing, in a second processing stage, each frame of the frame sequence based on the visual feature set and the sensor readings included in that frame, in order to generate a sequence mapping graph, and merging, in a third processing stage, the sequence mapping graph with at least one other graph, in order to generate or update a full graph.

In an implementation form of the second aspect, a visual feature set includes an image feature set comprising one or more 2D key points extracted from the related image, descriptors corresponding to the 2D key points, and disparity and/or depth information of the 2D key points.

In a further implementation form of the second aspect, the method comprises, in the first processing stage: extracting an image from the data sequence, rectifying the image, extracting 2D key points from the rectified image, and generating an image feature set based on the extracted 2D key points.

In a further implementation form of the second aspect, the method comprises, in the first processing stage: assigning one or more semantic labels to the pixels of the rectified image, and filtering the image feature set based on the semantic labels to remove 2D key points from the image feature set related to objects labelled as dynamic objects.

In a further implementation form of the second aspect, the method further comprises, in the first processing stage: generating a visual feature set by adding a bag-of-words descriptor to the filtered image feature set, and optionally a hash table for searching the 2D key points, and generate a frame by combining the visual feature set with sensor readings from the same time instance of the image.

In a further implementation form of the second aspect, the method comprises, in the second processing stage: performing camera tracking based on a visual feature set included in a frame by matching 2D key points in the visual feature set to locally stored 3D key points, in order to obtain a camera pose associated with the frame.

In a further implementation form of the second aspect, the method comprises: determining whether the frame is a key frame based on a number of matched 2D key points.

In a further implementation form of the second aspect, the method further comprises, in the second processing stage, if determining that the frame is a key frame: performing a first LBA based on the camera pose, in order to obtain visual odometry information and a LBA graph, calculating a fused camera pose based on the visual odometry information and the sensor readings included in the frame, and performing a second LBA based on the fused camera pose and the LBA graph, in order to obtain the sequence mapping graph.

In a further implementation form of the second aspect, the method further comprises, in the third processing stage: detecting the presence of one or more loops and/or overlapping areas shared among the sequence mapping graph and the at least one further graph, merging the sequence mapping graph and the at least one further graph, in order to obtain an intermediate graph, and performing a graph optimization on the intermediate graph based on the detected loops and/or overlapping areas, in order to obtain the full graph.

In a further implementation form of the second aspect, the at least two of the three processing stages are performed in different processors.

In a further implementation form of the second aspect, the method is performed in a distributed device including at least one terminal device and at least one network device. The terminal device performs the first processing stage and transmit the obtained frame sequence to the network device, and the network device performs the second and third processing stages.

In a further implementation form of the second aspect, the terminal device further performs a real-time localization based on the frame sequence obtained in the first processing stage.

In a further implementation form of the second aspect, the terminal further performs the real-time localization according to the second processing stage described above, wherein the second LBA is replaced by a fusion tracking procedure based on the fused camera pose, the LBA graph and a current full graph, in order to obtain a current camera pose.

In a further implementation form of the second aspect, the terminal device is located in a vehicle and the vehicle includes the at least one camera and multiple sensors.

With the method of the second aspect and its implementation forms, the advantages and effects described above for the device of the first aspect and its respective implementation forms are achieved.

Embodiments of the present disclosure are based on several improvements, such as the exemplary improvements described below:

Software Architecture: The processing architecture of the device (separation into three processing stages) enables a modular approach that can be used for real-time distributed SLAM. In this way, the full graph (global map) can always be updated while doing localization, and only the extracted features need to be transmitted instead of the whole image (i.e., lower data rate).

The separation of sequence mapping and final graph optimization: the process of mapping a sequence, which is focusing on having an accurate output based on visual information is separated from the full graph (global map) update, which will perform the final overall optimization taking into account the availability of multiple overlapping sequences. In this way, all information from all sequences can be properly used because of the process separation instead of having a single process in performing the graph update. Additionally, the graph update can correct GPS bias, since this is observable due to the availability of multiple overlapping sequences.

Multiple sensor fusion: two Bundle Adjustments during the Sequence Mapping are used, wherein the first LBA is called a Standard LBA, and the second one fuses the output of the first LBA and a fused camera pose based on e.g. GPS, IMU readings and visual odometry information. The aim is to guarantee two separate independent processes of reprojection error optimization (done in the first LBA) and the GPS/IMU fusion prior to another optimization in the second LBA. In this way, the feature matching process in the first LBA is not affected by noisy GPS/IMU readings. In contrast to the above-described second approach, also IMU reading are fused.

It has to be noted that all devices, elements, units, and means described in the present disclosure could be implemented in the software or hardware elements or any kind of combination thereof. All steps which are performed by the various entities described in the present disclosure as well as the functionalities described to be performed by the various entities are intended to mean that the respective entity is adapted to or configured to perform the respective steps and functionalities. Even if, in the following description of exemplary embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of exemplary embodiments in relation to the enclosed drawings, in which.

DETAILED DESCRIPTION

Figure 1:
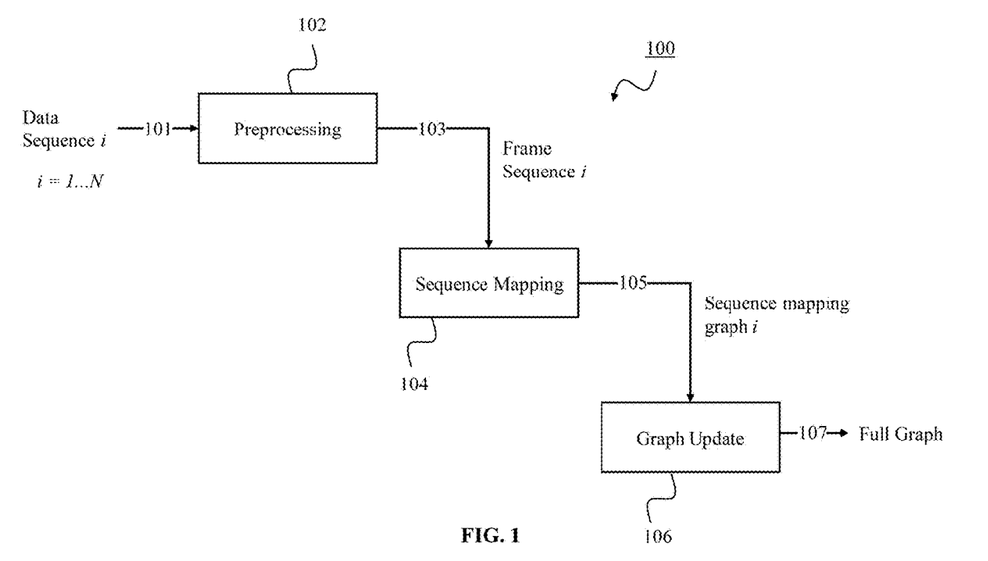
FIG. 1 shows a device according to an exemplary embodiment of the present disclosure.

FIG. 1 shows a device 100 according to an exemplary embodiment of the present disclosure. The device 100 is configured to perform SLAM, particularly a feature-based SLAM method. FIG. 1 shows the modularity of this SLAM method, which can be performed in an offline mapping process. It is assumed that several sequences of recordings are available to be processed. The feature-based SLAM method carried out by the device 100 is divided into three processing stages: a first processing stage 102 ("Preprocessing"), a second processing stage 104 ("Sequence Mapping") and a third processing state 106 ("Graph update" also referred to as "Global Map Update").

The device 100 comprises at least one processor configured to carry out the processing stages 102, 104 and 106, respectively. At least two of the three processing stages 102, 104 and 106 may be performed in different processors of the device 100. The device 100 may in this case be a distribute device (e.g. terminal device and network device). It is also possible that each processing stage 102, 104, and 106 is performed in a different processor.

In the first processing stage 102, a received data sequence 101 is preprocessed. The data sequence 101 includes at least multiple images recorded by a camera (or recorded by multiple cameras) and sensor readings from multiple sensors 501 (see e.g. FIG. 5), in order to obtain a frame sequence 103. The multiple sensors can include GPS and IMU. The frame sequence 103 comprises one or more frames, which are arranged in a sequence. Each frame of the frame sequence 103 includes a visual feature set, which is related to one of the images in the data sequence 101, namely an image taken at a determined time instance, and further includes sensor readings 502 (see e.g. FIG. 5) from that time instance. That is, the data sequence 101 includes images that are time-correlated with sensor readings 502. A time instance may thereby be a determined point or an interval in time, or may be a point or time interval relative to some starting point.

In the second processing stage 104, each frame of the frame sequence 103 is sequentially processed based on the visual feature set and the sensor readings 502 included in that frame, in order to generate a sequence mapping graph 105. A visual feature set may include an image feature set comprising one or more 2D key points extracted from the related image, descriptors corresponding to the 2D key points, and disparity and/or depth information of the 2D key points.

In the third processing stage 106, the sequence mapping graph 105 is merged with at least one other graph 400 (see e.g., FIG. 4, where it is merged with an "Initial Graph"), in order to generate or update a full graph 107 (also referred to as "Full Map" or "Global Map").

Figure 2:
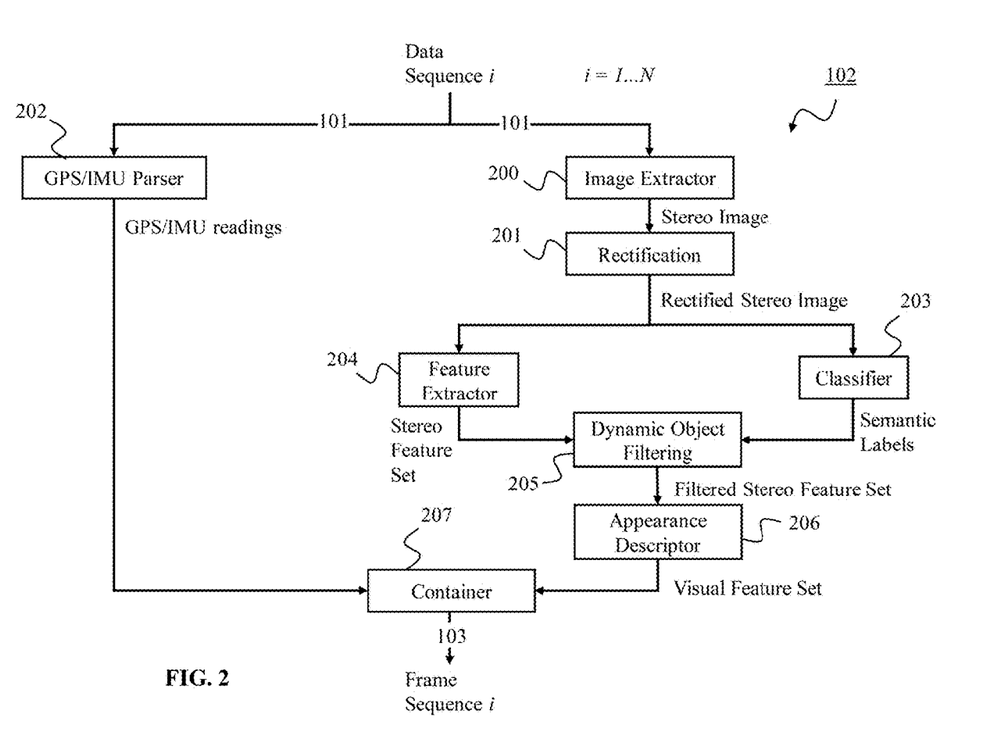
FIG. 2 shows a first processing stage of a device according to an exemplary embodiment of the present disclosure.

FIG. 2 shows an example of the first "Preprocessing" stage 102 in more detail. This processing stage 102 has the goal to process a certain recorded data sequence 101 (data sequence i) to output a frame sequence 103. Thereby, for example, at each discrete time t a frame consists of a visual feature set corresponding to an image in the data sequence 101 at time t and the sensor readings 502 (e.g. GPS and IMU readings) between, e.g., the times [t−1, t] included in the data sequence 101. It may be assumed that the data sequence 101 contains stereo images. A visual feature set may consist of an image feature set (e.g., a stereo feature set in case of stereo images), and a bag-of-words (BoW) descriptor after removing points corresponding to the dynamic objects. Additionally, a hash table can be created to allow for searching Key Points in a particular region of the image. A stereo feature set may include of stereo 2D Key Points and their corresponding descriptors extracted from the stereo image by means of a feature extractor method, such as ORB (Oriented FAST and Rotated BRIEF), and may further include the disparity and depth for each stereo match, which forms the 3D Key Points. The benefit is to be able to store the preprocessed frames of the frame sequence 103 to be used in the next processing stage 104. This will facilitate the debugging process and allows storing only relevant information instead of the whole image.

The process in the first processing stage 102 starts by extracting an image (here exemplarily a stereo image) out of a recorded data sequence 101 by means of an Image Extractor unit 200. The stereo image is then processed by a Rectification unit 201, in order to transform the image onto a common image plane to yield here a rectified stereo image. In one processing branch, the rectified stereo image is then fed into a Feature Extractor unit 204 to extract 2D Key Points in each image (i.e. Left and Right). These 2D Key Points are then further processed by a stereo matching procedure to find 2D Key Points, which have stereo correspondence. Finally, a 3D reconstruction procedure is done, in order to place those 2D Key Points into a 3D coordinate system based on the disparity/depth information obtained from the stereo matching. 2D Key Points, which do not have stereo correspondence, may still be kept. Notably, when extracting the 2D Key Points, the corresponding feature descriptors may also be extracted and may be included in the output, i.e., into the stereo feature set.

In the other processing branch, the rectified image is fed into a Classifier unit 203 using a conventional concept to output a set of semantic labels assigned to image pixels of the rectified image. It may be helpful to perform a down sampling of the input rectified image to allow for a faster processing.

Further, a Dynamic Object Filtering unit 205 then processes the input stereo feature set by removing 2D Key Points, which correspond to the semantic labels belonging to dynamic objects, such as cars, bicycles, motorcycles. Furthermore, an Appearance Descriptor unit 206 is used to add more information to the input filtered stereo feature set, particularly by appending the BoW descriptor and optionally a hash table, which is constructed to further increase the speed and robustness, to finally complete the content of the visual feature set. If there is a constraint on the data size of the output frame sequence the Appearance Descriptor may be an optional processing unit. The actual processing may simply be done directly in the unit that requires the information, e.g., the hash table may be done in the Camera Tracking 301 in FIG. 3 and the BoW descriptor in the Loop Detection & Merging 401 in FIG. 4.

As the last step, the extracted sensor readings (here exemplarily readings from GPS and IMU) between two consecutive images as processed by a GPS/IMU Parser 202, and are appended to the visual feature set by a Container unit 207 to form an output frame. Because an offline processing may involve the usage of multi-threading processing in some or all of the above processing units, the output sequence may be guaranteed to form an ordered frame sequence 103 based on timestamps.

Figure 3:
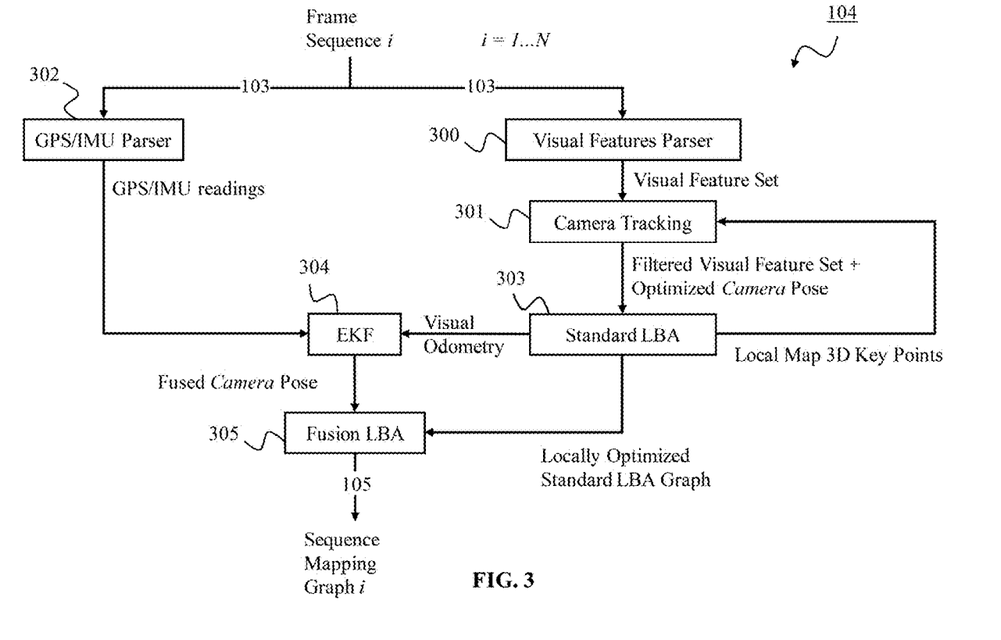
FIG. 3 shows a second processing stage of a device according to an exemplary embodiment of the present disclosure.

FIG. 3 depicts an example of the second processing stage 104, i.e., "Sequence Mapping", in more detail, wherein the frames of the frame sequence 103 are to be processed sequentially. The goal of this processing stage 104 is to create a "partial graph" (or "partial map") or "sequence mapping graph" out of an input frame sequence 103. A graph consists generally of vertices and edges, and there are two types of vertices of the sequence mapping graph, i.e., camera poses with the corresponding Key Frames and 3D Key Points. A Key Frame simply refers to a frame, which has been selected to be part of the graph. The edges are simply showing a relation between those two types of vertices. Technically, each edge relates a 3D Key Point to a camera pose by computing the reprojection error of the point for a given camera pose. If the reprojection error is below a certain threshold the edge is established.

In one processing branch of the second processing stage 104, the visual feature set of the frame at time t is extracted by a Visual Features Parser unit 300, which visual feature set is then processed locally by Camera Tracking 301. Here the matching between the 2D Key Points of the current frame and the stored Local Map 3D Key Points is done by reprojecting the Local Map 3D Key Points onto the current image 2D plane. To enable this, the current image camera pose is predicted (e.g., by employing a motion model to the past camera poses) and an iterative algorithm is then performed to slowly modify the camera pose from an initial predicted pose to minimize the reprojection error. The filtering of outliers can also be done during this iteration, e.g. by rejecting points, which have their minimum reprojection errors above a certain reprojection error threshold. This will make the final output to be a filtered visual feature set and an optimized camera pose. The filtered visual feature set may contain additional information, which may be the correspondence between the 2D Key Points of the frame and the Local Map 3D Key Points.

Once the optimized camera pose is obtained, then the decision to insert a frame into the Standard LBA Graph may be taken, considering the number of tracked and untracked points. When a certain condition is met, the frame is inserted into the graph and called a Key Frame, which has a corresponding camera pose. The 2D Key Points in the frame, which do not have correspondence with the Local Map 3D Key Points, are inserted into the graph as new Local Map 3D Key Points and their 3D locations are taken from the 3D Key Points of the frame. Notably, those 2D Key Points of the frame, which do not have any 3D Key Points (stereo correspondence) may be discarded. The corresponding optimized camera pose is forming the initial pose guess for the next step where the graph is locally optimized by means of Standard Local Bundle Adjustment 303. "Local" here implies that there is a temporal observation window, which extends to the past, and "Standard" here implies the usage of a camera sensor only, and BA is a method that finds optimized camera poses and 3D Key Point locations, which minimize the reprojection error given the filtered visual feature set information.

The final output is a locally optimized graph and the optimized camera pose of the new Key Frame is sent to an Extended Kalman Filter (EKF) unit 305 as a visual odometry (relative camera pose changes) information. The visual odometry information is then fused with the sensor readings (here from GPS and IMU as obtained from the frame sequence 103 by a GPS/IMU Parser unit 302), which are taken between the past and current images, by the EKF unit 305, in order to output a fused camera pose.

When the frame is not considered as a Key Frame, the process continues by bypassing the Standard LBA unit 303 and forwards the optimized camera pose as the visual odometry information to the EKF unit 304. The EKF unit 304 uses this information to update its internal state and no further process is required (no Fusion LBA 305 as well). The whole Sequence Mapping process 104 continues with the processing of the next frame t+1.

The fused camera pose and previously obtained Standard LBA graph are then fed into the Fusion LBA 305 to output an optimized Fusion LBA graph or Sequence Mapping Graph 105. This graph 105 is different compared to the ORB-SLAM graph and the above-mentioned Standard LBA graph, because its Key Frames correspond to the optimized camera poses instead of camera poses after taking into account the sensor readings, while still keeping the 3D Key Points information. Then, as in the above-mentioned second approach, a barrier term is used for the reprojection error. This prevents the system to overfit to, e.g. GPS and IMU data, and to be prone to inlier loss and tracking failures. In contrast to the second approach, the EKF unit 304 processes multiple sensor readings, i.e. here exemplarily both GPS and IMU readings, instead of only GPS.

The proposed Fusion LBA (FLBA) optimization in the unit 305 may be as follows:

$$x^*_{FLBA} = \underset{x}{\mathrm{argmin}}\left(\frac{\gamma}{e_t - e_r(x)} + e_{EKF}(x)\right)$$

where $x_{FLBA}^*$ is the optimized parameters, i.e., local camera poses and local 3D Key Points, y is a constant variable, $e_t$ is the barrier threshold term, which is slightly larger than the residual error Standard LBA $e_r(x_{LBA})$, $e_r(x)$ is the overall reprojection error term and $e_{EKF}(x)$ is the EKF error term.

$$e_r(x) = \sum_{k \in G_L \cup G_F} \sum_{i \in M_k} \rho(\Delta z_i^T(x) \Lambda_i \Delta z_i(x))$$

where $G_L$ is a set of local Key Frames, $G_F$ is a set of covisible Key Frames (Key Frames that are also observing the local Key Points), $M_k$ is a set of 3D Key Points observed from a Key Frame k, $\rho()$ is the Huber norm, $\Delta z_i(x)$ is the individual reprojection error term for Key Point i, $\Lambda$ is the inverse of pixel error covariance and $()^T$ denotes a transpose operation, $$e_t = \lambda e_r(x_{LBA}), \; \lambda \geq 1$$

$$e_{EKF}(x) = \sum_{k \in G_L} \rho\left(\|\log_{SE(3)}([T_{EKF,k}]^{-1} T_{WC}(x_k))\|_\Sigma^2\right)$$

where $\log_{SE(3)}$ is the 3D Standard Euclidean Group logarithm returning a lie algebra representation as a 6-dimensional vector, $T_{EKF,k}$ is the transformation matrix between the map origin and the camera pose estimated by EKF for the Key Frame k, $T_{WC}(x_k)$ is the transformation matrix between the map origin and the camera pose predicted depending on $x_k$, $\Sigma$ is the EKF error covariance and $\|A\|_\Sigma^2 = A^T \Sigma^{-1} A$.

In an embodiment, a simplified second processing stage 104 may be obtained by excluding the Standard LBA unit 303, hence no Visual Odometry input to the EKF unit 304 is needed. Furthermore, the output of Camera Tracking unit 301, i.e., Filtered Visual Feature Set and Optimized Camera Pose, goes directly to the Fusion LBA unit 305, which will perform the optimization without the barrier term as follows:

$$x^*_{FLBA} = \underset{x}{\mathrm{argmin}}(e_r(x) + e_{EKF}(x))$$

The Fusion LBA unit 305 additionally outputs the Local Map 3D Key Points, which will be fed into the Camera Tracking unit 301. This simplified processing may have computational benefit in exchange for a drawback, which is making the processing to be prone to inlier loss and tracking failures.

Figure 4:
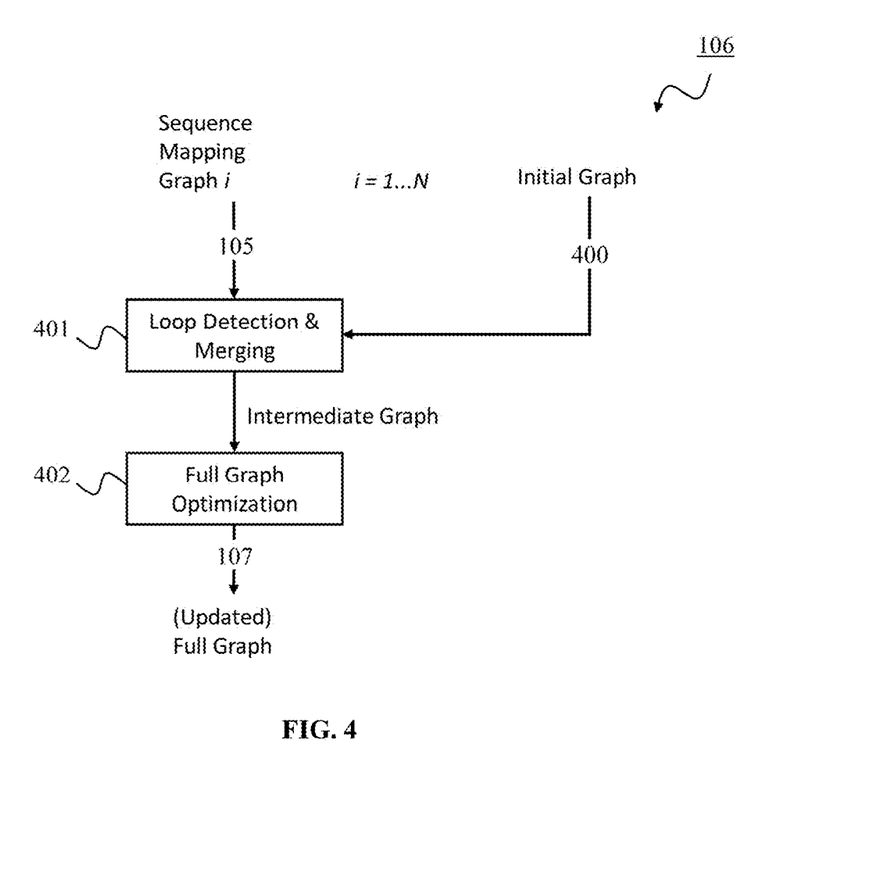
FIG. 4 shows a third processing stage of a device according to an exemplary embodiment of the present disclosure.

An example of the final processing stage 106, i.e. the "Graph Update" or "Global Map Update", is shown in more detail in FIG. 4, with the aim to enable the merging of multiple Sequence Mapping Graphs 105 into a unified full graph 107 (also referred to as "Global Map"). The main task of this processing stage 106 is to detect the presence of loops or overlapping areas shared among multiple input sequence mapping graphs 105 in a Loop Detection and Merging unit 401, and to perform an optimization on those detected areas in a Full Graph Optimization unit 402. The BoW descriptor together with the sensor readings are used to extract the candidate Key Frames to enable the loop detection. The intermediate graph is simply an unoptimized graph as a result of merging the 3D Key Points in another graph 400 (here "Initial Graph") and the Sequence Mapping Graph 105. The availability of multiple overlapping sequences facilitates the correction of e.g. GPS bias.

The proposed Full Graph Optimization equation may be as follows:

$$\{x_{FGO}, b\} = \underset{x,b}{\mathrm{argmin}}(e_r(x) + \beta e_{EKF}(x, b))$$

where b is the bias term and $\beta$ is a constant, $$e_r(x) = \sum_{k \in G_{Loop}} \sum_{i \in M_k} \rho(\Delta z_i^T(x) \Lambda_i \Delta z_i(x))$$

where $G_{Loop}$ is a set of Key Frames in the extended overlapping graph area, $$e_{EKF}(x, b) = \sum_{k \in G_{Loop}} \rho\left(\|\log_{SE(3)}([T_{EKF}(b_k)]^{-1} T_{WC}(x_k))\|_\Sigma^2\right) + \alpha_1 \left\|\frac{b_k - b_{k-1}}{n+1}\right\|^2 + \alpha_2 \|b_k\|^2$$

where $T_{EKF}(b_k)$ is the transformation matrix between the map origin and the camera pose estimated by EKF after taking into account the bias for Key Frame k, $\alpha_1$ and $\alpha_2$ are constatnts, and n is the number of skipped frames between the current and previous Key Frame.

Preferably, redundant Key Frames are removed, in order to avoid the graph complexity to increase substantially. Notably, the barrier term has not been used for this optimization due to computational complexity reason; however, it could be easily introduced as in the Fusion LBA when permitted.

Figure 5:
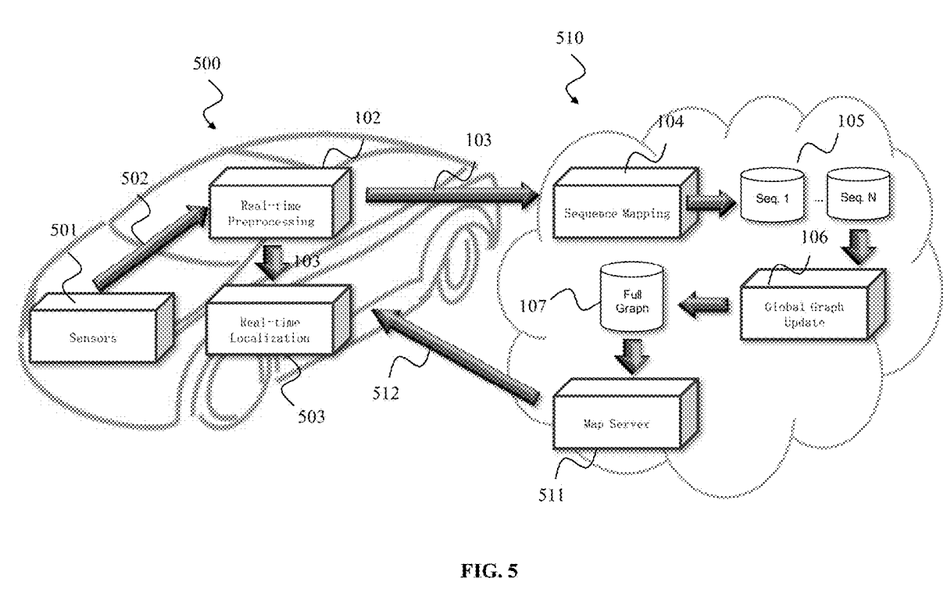
FIG. 5 shows a device for distributed processing according to an exemplary embodiment of the present disclosure.

Now that the offline mapping process has been described, a proposed real-time distributed SLAM can be derived as shown in FIG. 5. To facilitate the real-time operation of the proposed SLAM method performed by the device 100, the previously described architecture usable for the offline mapping (i.e., the processing stages 102, 104 and 106) can be re-arranged into the following architecture.

Firstly, the first processing stage 102 ("Preprocessing") may be modified to receive inputs directly from sensors 501 (e.g., stereo camera, GPS, and IMU) and to perform the process in a real-time manner ("Real-time Preprocessing"). The first processing stage 102 may be carried out in a terminal device 500, e.g. in a vehicle.

The output frame sequence 103, which is obtained after a certain period of time, may then be transmitted by the terminal device 500 through a network to a network device 510, e.g., a cloud server, to perform the second and third processing stages 104 and 106 ("Sequence Mapping" and "Global Graph Update"). Given the fact that there may be several inputs simultaneously collected by the network device 510 from different terminal devices 500 (i.e., distributed processing and crowdsourcing methods), an intelligent process may be initiated, which is capable of assigning high priority processes to those sequences, which contain new information. The updated full graph 107 (Global Map) output by the third processing stage 106 may then be stored in a map server 511, and may be available to be downloaded by any terminal device 510, client or vehicle wanting to perform, e.g., the Localization.

Figure 6:
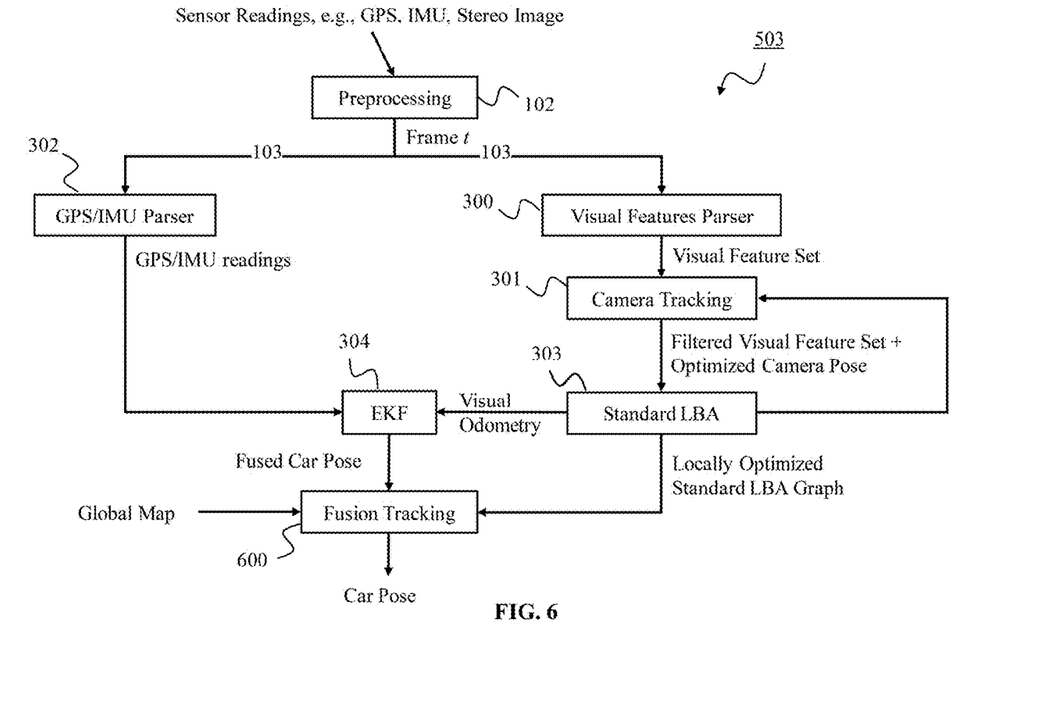
FIG. 6 shows real-time localization in a device for distributed processing according to an exemplary embodiment of present disclosure.

In a Real-time Localization processing stage 503 as soon as the "Preprocessing" 102 outputs a frame t of the frame sequence 103 as a result of processing the sensor readings 502 corresponding to time t, as shown in FIG. 6, data parsing may be performed like in the second processing stage 104, namely by a GPS/IMU and Visual Features Parser unit 300. This data parsing could also be skipped, if the first processing stage 102 directly outputs the data separately. The main change in the Real-time Localization processing stage 503 (compared to the second processing stage 104) is the presence of Fusion Tracking 600 (see FIG. 6) instead of the Fusion LBA 305 (see FIG. 3). The Fusion Tracking 600 outputs an optimized camera pose taking into account all inputs, i.e., fused camera pose, "Global Map" (or full graph), and the local Standard LBA Graph. For every input frame the Fusion Tracking 600 always outputs an estimated camera pose regardless of whether the frame is considered as a Key Frame or not.

In practice, it is not necessary to use the whole region of the Global Map to perform a Localization, a particular region of interest shall be sufficient, e.g., a region within a current sensor reading (e.g. GPS reading). Obtaining the latest full graph 107 (also referred to as Global Map) corresponding to the particular region of interest from the map server 511 shall keep the terminal device 500 well informed with the latest updates or changes, which can be helpful in situations such as traffic jams, accidents, road construction works.

In this case the current GPS bias can be also corrected during localization. The Fusion Tracking 600 may be described as:

$$\{\xi^*, b^*\} = \operatorname*{argmin}_{\xi,b}\left(\frac{\gamma}{e_t - e_r(\xi)} + e_{EKF}(\xi, b)\right)$$

where $\xi^*$ is an optimized camera pose, $$e_r(\xi) = \sum_i \rho(\Delta z_i^T(\xi)\Lambda_i\Delta z_i(\xi))$$

$$e_{EKF}(\xi, b) =$$
$$\rho\left(\|\|\log_{SE(3)}([T_{EKF}(b)]^{-1}T_{WC}(\xi))\|_\Sigma^2\right) + \alpha_1\|b - b_{-1}\|^2 + \alpha_2\|b\|^2$$

where $b_{-1}$ is the previous bias term, $$e_t = \lambda e_r(\xi_{LBA}), \lambda \geq 1$$

Another possibility would be to perform the optimization without the barrier term:

$$\{\xi^*, b^*\} = \operatorname*{argmin}_{\xi,b}(e_r(\xi) + \beta e_{EKF}(\xi, b))$$

Figure 7:
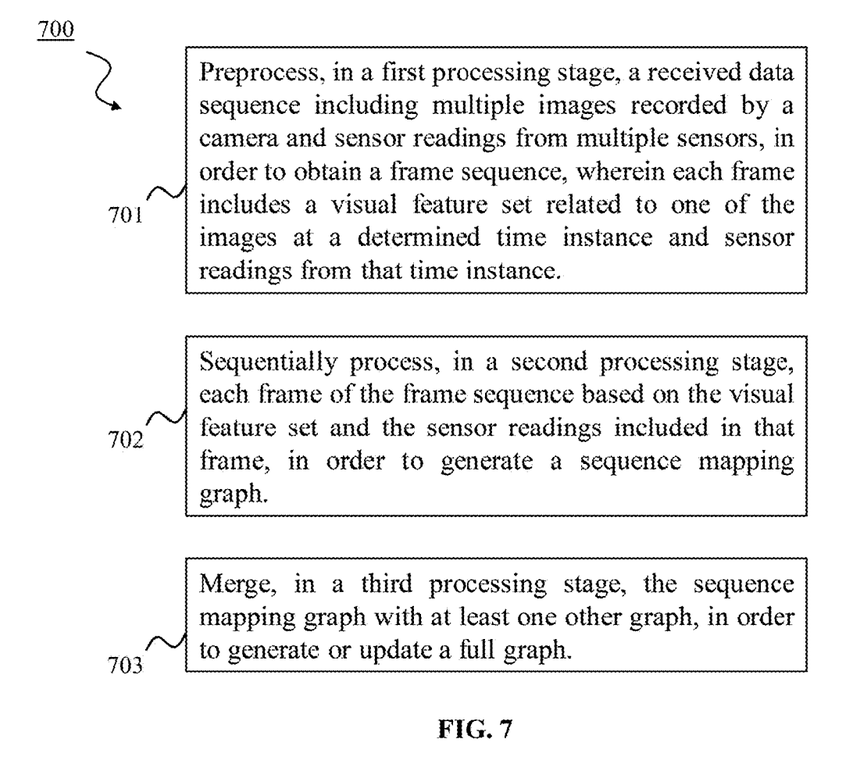
FIG. 7 shows a method according to an exemplary embodiment of the present disclosure.

FIG. 7 shows a method 700 according to an exemplary embodiment of the present disclosure. The method 700 is for performing SLAM, and may be the SLAM method carried out by the device 100. The method accordingly includes: A step 701, as a first processing stage 102, of preprocessing a received data sequence 101 including multiple images recorded by a camera and sensor readings from multiple sensors 501, in order to obtain a frame sequence 103, wherein each frame includes a visual feature set related to one of the images at a determined time instance and sensor readings 502 from that time instance. A step 702, as a second processing stage 104, of sequentially processing each frame of the frame sequence based on the visual feature set and the sensor readings 502 included in that frame, in order to generate a sequence mapping graph 105. A step 703, as a third processing stage 106, of merging the sequence mapping graph 105 with at least one other graph 400, in order to generate or update a full graph 107.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A device for performing simultaneous localization and mapping (SLAM), the device comprising at least one processor configured to:
preprocess, in a first processing stage, a received data sequence comprising multiple images recorded by a camera and sensor readings from multiple sensors in order to obtain a frame sequence, each frame of the frame sequence comprising a visual feature set related to one of the images at a determined time and the respective sensor readings from the determined time;
sequentially process, in a second processing stage, each frame of the frame sequence based on the visual feature set and the sensor readings comprised in that frame in order to generate a sequence mapping graph; and
merge, in a third processing stage, the sequence mapping graph with at least one other graph in order to generate or update a full graph.

2. The device according to claim 1, wherein:
the visual feature set comprises an image feature set comprising one or more 2D key points extracted from the related one of the images, descriptors corresponding to the 2D key points, and disparity or depth information of the 2D key points.

3. The device according to claim 2, wherein the at least one processor is configured to, in the first processing stage:
extract an image from the data sequence, the image being one of the multiple images;
rectify the image;
extract the 2D key points from the rectified image; and
generate the image feature set based on the extracted 2D key points.

4. The device according to claim 3, wherein the at least one processor is configured to, in the first processing stage:
assign one or more semantic labels to pixels of the rectified image; and
filter the image feature set based on the semantic labels to remove the 2D key points from the image feature set related to objects labelled as dynamic objects.

5. The device according to claim 4, wherein the at least one processor is further configured to, in the first processing stage:
generate the visual feature set by adding a bag-of-words descriptor to the filtered image feature set, and
generate a respective frame of the frame sequence by combining the visual feature set with the sensor readings from a same time instance of the image.

6. The device according to claim 5, wherein the at least one processor is further configured to, in the first processing stage: generate the visual feature set by adding a hash table for searching the 2D key points.

7. The device according to claim 1, wherein the at least one processor is configured to, in the second processing stage:
perform camera tracking based on the visual feature set included in a respective frame of the frame set by matching 2D key points in the visual feature set to locally stored 3D key points, in order to obtain a camera pose associated with the respective frame.

8. The device according to claim 7, wherein the at least one processor is configured to:
determine whether the frame is a key frame based on a number of the matched 2D key points.

9. The device according to claim 8, wherein the at least one processor is further configured to, in the second processing stage, based upon determining that the frame is the key frame:

perform a first local bundle adjustment (LBA) based on a camera pose in order to obtain visual odometry information and a LBA graph;

calculate a fused camera pose based on the visual odometry information and the sensor readings included in the frame; and perform a second LBA based on the fused camera pose and the LBA graph in order to obtain the sequence mapping graph.

10. The device according to claim 1, wherein the at least one processor is further configured to, in the third processing stage:

detect a presence of one or more loops or overlapping areas shared among the sequence mapping graph and the at least one further graph;

merge the sequence mapping graph and the at least one further graph in order to obtain an intermediate graph; and perform a graph optimization on the intermediate graph based on the detected loops or the overlapping areas in order to obtain the full graph.

11. The device according to claim 1, wherein at least two of the first processing stage, the second processing stage, or the third processing stage are performed in different processors of the at least one processor.

12. The device according to claim 1, wherein:

the device is a distributed device and comprises at least one terminal device and at least one network device, a processor of the terminal device is configured to perform the first processing stage and transmit the obtained frame sequence to the network device, a processor of the network device is configured to perform the second and third processing stages, and the at least one processor comprises the processor of the terminal device and the processor of the network device.

13. The device according to claim 12, wherein the processor of the terminal device is further configured to:

perform a real-time localization based on the frame sequence obtained in the first processing stage.

14. The device according to claim 13, wherein the processor of the terminal device is further configured to, in the second processing stage, based upon determining that a frame of the frame sequence is a key frame:

perform a first local bundle adjustment (LBA) based on a camera pose in order to obtain visual odometry information and a LBA graph;

calculate a fused camera pose based on the visual odometry information and the sensor readings included in the frame; and perform a fusion tracking procedure based on the fused camera pose, the LBA graph, and a current full graph in order to obtain a current camera pose.

15. The device according to claim 12, wherein the terminal device is located in a vehicle, and the vehicle comprises the at least one camera comprising the camera and at least one of the multiple sensors.

16. A method for performing simultaneous localization and mapping (SLAM), the method comprising:

preprocessing, in a first processing stage, a received data sequence comprising multiple images recorded by a camera and sensor readings from multiple sensors in order to obtain a frame sequence, each frame of the frame sequence comprises a visual feature set related to one of the images at a determined time and sensor readings from the determined time;

sequentially processing, in a second processing stage, each frame of the frame sequence based on the visual feature set and the sensor readings comprised in that frame in order to generate a sequence mapping graph; and merging, in a third processing stage, the sequence mapping graph with at least one other graph in order to generate or update a full graph.

* * * * *